(12) United States Patent
Nishi

(10) Patent No.: US 9,621,816 B2
(45) Date of Patent: Apr. 11, 2017

(54) LIGHTING CONTROL DEVICE AND LIGHTING CONTROL METHOD

(71) Applicant: Panasonic Intellectual Property Management Co., Ltd., Osaka (JP)

(72) Inventor: Chie Nishi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/864,954

(22) Filed: Sep. 25, 2015

(65) Prior Publication Data
US 2016/0112621 A1 Apr. 21, 2016

(30) Foreign Application Priority Data

Oct. 15, 2014 (JP) ................. 2014-210920

(51) Int. Cl.
H04N 5/235 (2006.01)
H04N 17/00 (2006.01)
H04N 5/232 (2006.01)
H04N 5/225 (2006.01)
G03B 15/02 (2006.01)
H05B 33/08 (2006.01)
H05B 37/02 (2006.01)

(52) U.S. Cl.
CPC ........... *H04N 5/2354* (2013.01); *G03B 15/02* (2013.01); *H04N 5/2256* (2013.01); *H04N 5/23219* (2013.01); *H04N 5/23229* (2013.01); *H04N 17/002* (2013.01); *H05B 33/0854* (2013.01); *H05B 37/0227* (2013.01); *G03B 2215/0567* (2013.01); *G03B 2215/0571* (2013.01); *G03B 2215/0592* (2013.01); *G03B 2215/0596* (2013.01)

(58) Field of Classification Search
CPC .. H04N 5/2256; H04N 5/2351; G06K 9/2027; G06T 5/008
See application file for complete search history.

(56) References Cited

U.S. PATENT DOCUMENTS

2007/0212038 A1 9/2007 Asai et al.
2008/0297611 A1* 12/2008 Qiu ..................... H04N 5/2351
348/211.3

FOREIGN PATENT DOCUMENTS

JP 2008-161508 7/2008
JP 2013-538070 10/2013
WO 2005/099575 10/2005

* cited by examiner

*Primary Examiner* — Ahmed A Berhan
(74) *Attorney, Agent, or Firm* — Greenblum & Bernstein, P.L.C.

(57) ABSTRACT

A lighting control device includes: a luminance acquirer that acquires a luminance measured value of a fixed point of an object when the object is viewed from a predetermined viewpoint; and a lighting adjuster that individually controls a plurality of light sources irradiating the object from different directions based on the luminance measured value, and adjusts lighting on the object such that the luminance of the fixed point comes close to a predetermined setting value.

9 Claims, 10 Drawing Sheets

FIG. 6

| IDENTIFICATION INFORMATION ON FIXED POINT ~721 | IDENTIFICATION INFORMATION ON LIGHT SOURCE ~722 |
|---|---|
| FIRST FIXED POINT | FIRST LIGHT SOURCE |
| SECOND FIXED POINT | SECOND AND THIRD LIGHT SOURCES |
| THIRD FIXED POINT | FIRST AND FOURTH LIGHT SOURCES |
| ... | ... |
| N-TH FIXED POINT | L-TH LIGHT SOURCE |

| LUMINOSITY ADJUSTING MATRIX $V^0$ | LIGHT SOURCE LUMINOSITY MATRIX $P^0$ |
|---|---|
| $v^0_{11}$ | $p^0_1$ |
| $v^0_{22}$ | $p^0_2$ |
| $v^0_{33}$ | $p^0_2$ |
| ⋮ | ⋮ |
| $v^0_{LL}$ | $p^0_L$ |

LIGHTING CONTROL DEVICE AND LIGHTING CONTROL METHOD

BACKGROUND

1. Field of the Invention

The present disclosure relates to a lighting control device and a light control method for controlling lighting on an object.

2. Description of the Related Art

Sometimes an unnecessary gloss or shadow is generated in a surface of the object when the object is viewed from a predetermined viewpoint of a lens of a camera. For example, Unexamined Japanese Patent Publication No. 2008-161508 and Japanese Translation of PCT Publication No. 2005/099575 disclose technologies of reducing the gloss or the shadow.

In the technologies disclosed in Unexamined Japanese Patent Publication No. 2008-161508 and Japanese Translation of PCT Publication No. 2005/099575, a face that is of the object is disposed inside a small box, light emitted from a light source is diffused and reflected in the box, and the face is irradiated with light from a plurality of directions. Additionally, in the technology disclosed in Unexamined Japanese Patent Publication No. 2008-161508, luminosity of the light source is adjusted based on a measurement result of an illuminance measuring unit disposed near the face.

In the conventional technology, even if the object has irregularity like the face, the unnecessary gloss or shadow can be reduced because each portion is more evenly irradiated with the light. That is, in the conventional technology, a distribution or degree of the gloss or shadow (hereinafter, referred to as a "glossy state") that is generated in the object when the object is viewed from the predetermined viewpoint can be adjusted to a desired state that is of an even distribution.

CITATION LIST

Patent Literatures

PTL 1: Unexamined Japanese Patent Publication No. 2008-161508
PTL 2: Japanese Translation of PCT Publication No. 2005/099575

SUMMARY

However, in the conventional technology, it is necessary to prepare the box larger than the object, and it is necessary to fit the object in an opening of the box, which results in a state of being troublesome. Accordingly, there is a demand for a technology of easily adjusting the glossy state of the object.

Thus, a non-limiting exemplary embodiment of the present disclosure provides a lighting control device and a light control method for being able to easily adjust the glossy state of the object. Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a lighting control device includes: a luminance acquirer that acquires a luminance measured value of a fixed point of an object when the object is viewed from a predetermined viewpoint; and a lighting adjuster that individually controls a plurality of light sources irradiating the object from different directions based on the luminance measured value, and adjusts lighting on the object such that the luminance of the fixed point comes close to a predetermined setting value.

These general and specific aspects may be implemented using a device, a system, a method, and a computer program, and any combination of devices, systems, methods, and computer programs.

In the present disclosure, the glossy state of the object can easily be adjusted.

BRIEF DESCRIPTION OF DRAWINGS

FIG. 6 illustrates an example of a content of positional information in the second exemplary embodiment;

FIG. 9 illustrates an example of a content of reference information in the third exemplary embodiment.

DETAILED DESCRIPTION

Hereinafter, each exemplary embodiment of the present disclosure will be described in detail with reference to the drawings.

First Exemplary Embodiment

A first exemplary embodiment of the present disclosure is an example of a basic mode of the present disclosure.

Figure 1:
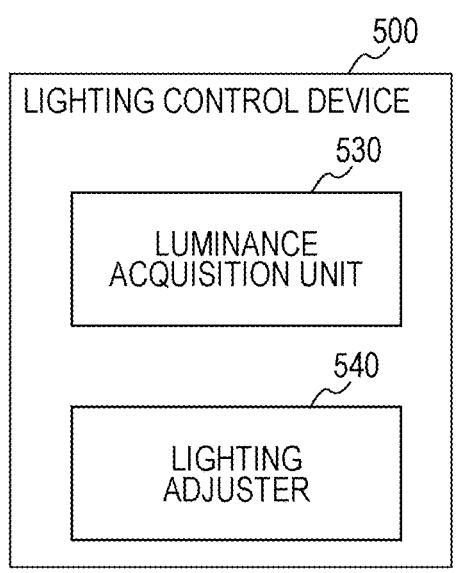
FIG. 1 illustrates an example of a configuration of a lighting control device according to a first exemplary embodiment.

FIG. 1 is a block diagram illustrating an example of a configuration of lighting control device 500 according to the first exemplary embodiment.

Referring to FIG. 1, lighting control device 500 includes luminance acquisition unit 530 and lighting adjuster 540.

Luminance acquisition unit 530 acquires a luminance measured value at a fixed point of an object when the object is viewed from a predetermined viewpoint.

Based on the luminance measured value, lighting adjuster 540 individually controls a plurality of light sources that irradiates the object from different directions, and lighting adjuster 540 adjusts the lighting on the object such that luminance at the fixed point comes close to a predetermined setting value of the luminance.

Although not illustrated, lighting control device 500 includes a CPU (Central Processing Unit), a storage medium such as a ROM (Read Only Memory) in which a control program is stored, and a work memory such as a RAM (Random Access Memory). In this case, the CPU executes the control program to implement a function of each unit.

Lighting control device 500 can facilitate the adjustment of the glossy state of the object.

Second Exemplary Embodiment

A second exemplary embodiment of the present disclosure is an example of a specific mode in the case that the present disclosure is applied to a lighting photographing device that photographs a face while the glossy state of the face is adjusted.

(Outline of Device)

An outline of the lighting photographing device including a lighting control device according to the second exemplary embodiment will be described below.

Figure 2:
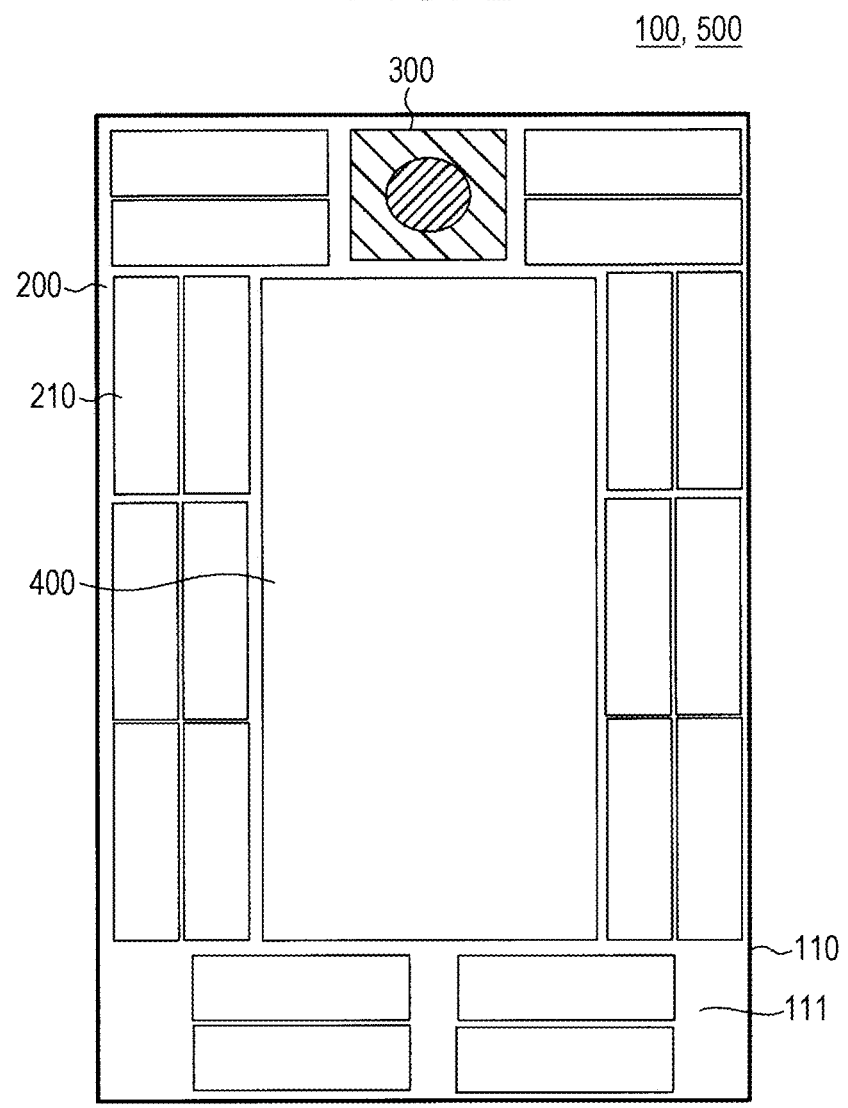
FIG. 2 illustrates an example of an appearance of a lighting control device according to a second exemplary embodiment.
Figure 3:
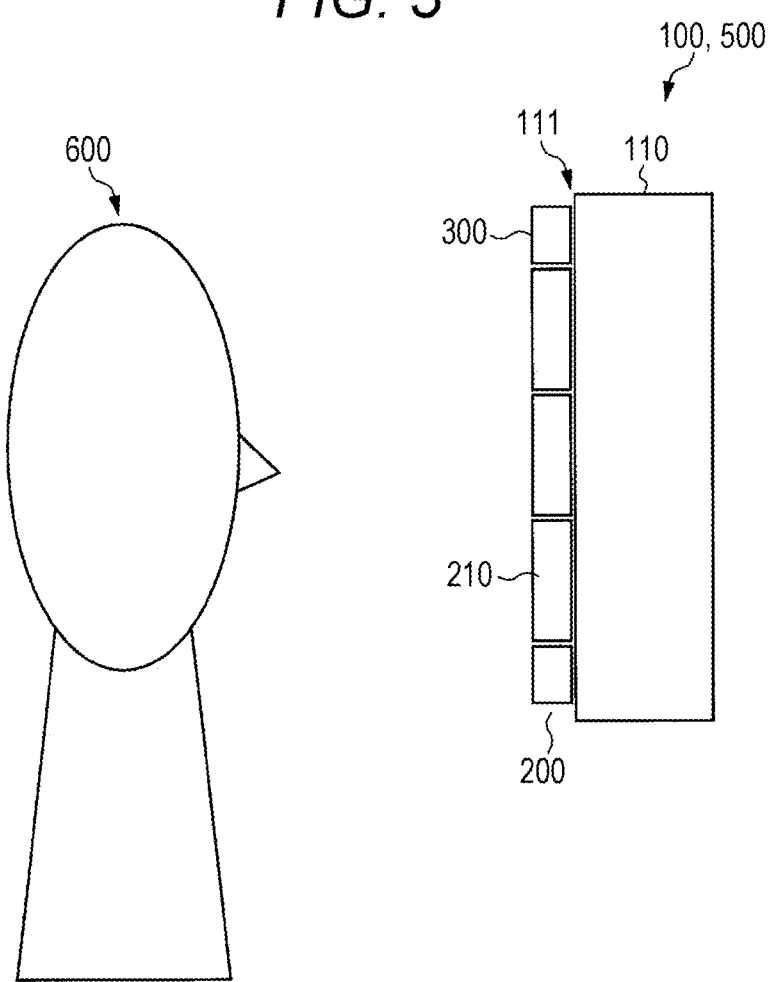
FIG. 3 illustrates an example of a usage state of the lighting control device according to the second exemplary embodiment.

FIG. 2 is a view illustrating an example of an appearance of the lighting photographing device according to the second exemplary embodiment. FIG. 3 illustrates an example of a usage state of the lighting photographing device according to the second exemplary embodiment.

As illustrated in FIG. 2, lighting unit 200, photographing unit (photographing device) 300, and display (display device) 400 are disposed on principal surface 111 of plate-like casing 110 of lighting photographing device 100 in lighting photographing device 100.

Although not illustrated in FIGS. 2 and 3, lighting control device 500 of the present disclosure is incorporated in casing 110 of lighting photographing device 100. Lighting control device 500 is described in detail later.

Principal surface 111 of casing 110 is a rectangular plane larger than a head of a human. A user disposes face 600 at a position (hereinafter, referred to as a "home position") near a center of principal surface 111. For example, the home position is separated from principal surface 111 by several tens of centimeters, and the center of face 600 faces the home position.

Lighting unit 200 includes first to L-th (in the second exemplary embodiment, L is an integer of 2 or more) light sources 210₁ to 210_L (see FIG. 4) disposed in an outer peripheral portion of principal surface 111. In each light source 210, a light emitting element such as an LED (Light Emitting Diode) in which lighting can be controlled by a control signal is used as a light source and light is emitted toward the outside on the side of principal surface 111. That is, first to L-th light sources 210₁ to 210_L irradiate face 600 from different directions.

For example, photographing unit 300 is a camera including a lens and an imaging element. Photographing unit 300 is disposed on principal surface 111. For example, photographing unit 300 photographs face 600 from a substantially front direction when face 600 is located at the home position.

For example, display 400 is a liquid crystal display equipped with a touch panel. Display 400 receives a user's manipulation and displays an image. For example, display 400 displays the image in which the image including user's face 600 photographed using photographing unit 300 is horizontally inverted.

Desirably a positional relationship between photographing unit 300 and first to L-th light sources 210₁ to 210_L is fixed.

Lighting control device 500 controls the operations of lighting unit 200, photographing unit 300, and display 400. In lighting control device 500, face 600 is photographed using photographing unit 300, the luminance of the photographed image is acquired at the fixed point of face 600, and light sources 210₁ to 210_L are individually controlled based on the acquired luminance, thereby adjusting the lighting on face 600.

In the case that the plurality of light sources irradiate the object having an irregular surface from the different directions, the glossy state (gloss or a distribution or degree of a shadow) of the object changes according to a pattern of luminosity of each light source. Accordingly, lighting photographing device 100 can change the face 600 of glossy state. Additionally, lighting photographing device 100 adjusts the lighting based on the luminance at the fixed point of face 600, so that the glossy state of face 600 can be adjusted so as to come close to the desired state.

(Configuration of Device)

Lighting control device 500 will be described in detail below. At first a configuration of lighting control device 500 will be described.

Figure 4:
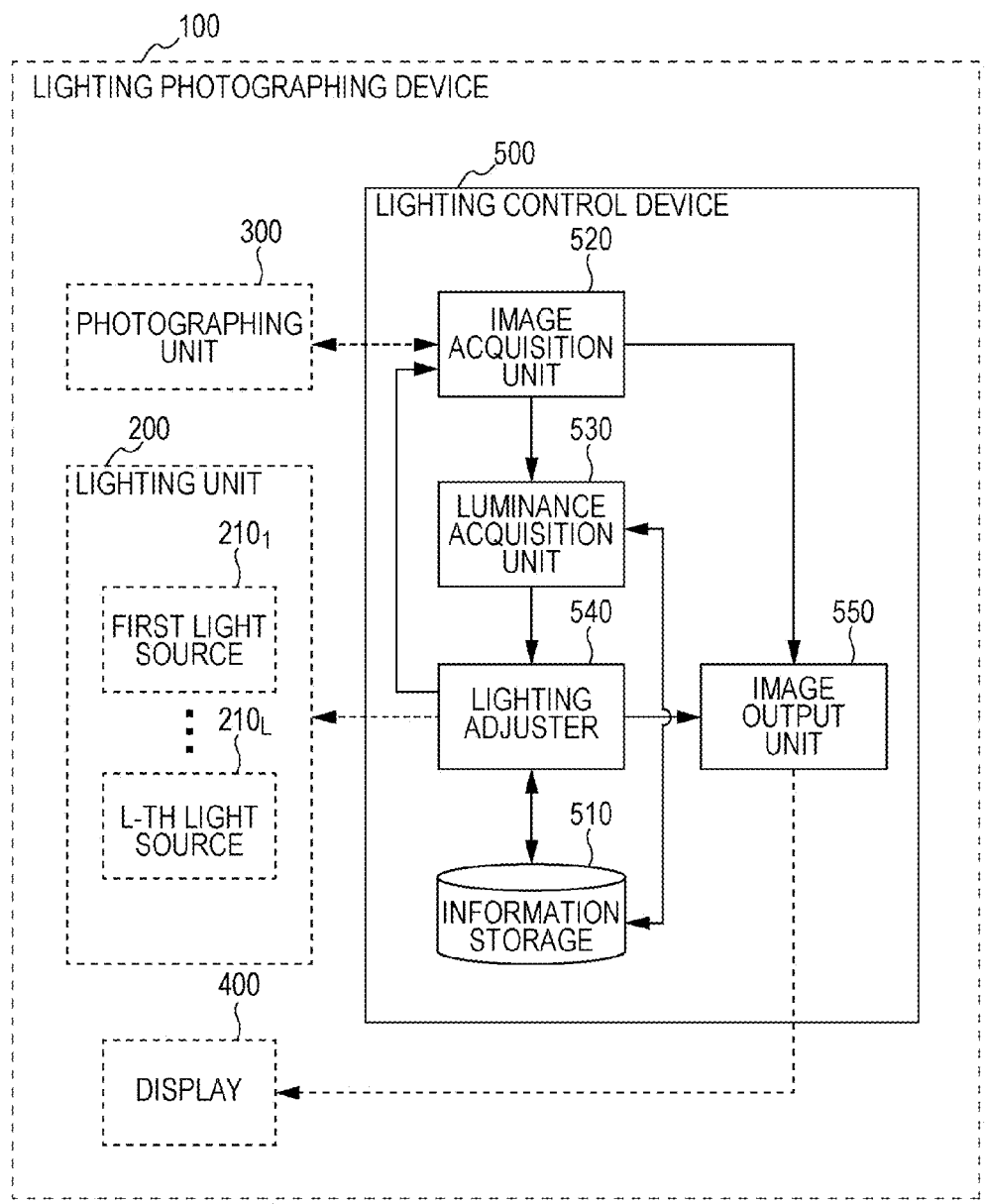
FIG. 4 illustrates an example of the configuration of the lighting control device according to the second exemplary embodiment.

FIG. 4 is a block diagram illustrating an example of the configuration of lighting control device 500. Other units of lighting photographing device 100 are also illustrated in FIG. 4 as a reference.

In FIG. 4, lighting control device 500 includes information storage 510, image acquisition unit 520, luminance acquisition unit 530, lighting adjuster 540, and image output unit 550.

Facial part information and fixed point information are previously stored in information storage 510. The facial part information indicates an image feature of each of facial parts such as a nose and eyes. The fixed point information indicates a positional relationship between the position of the facial part and the fixed point of the face. The fixed point of the face means a point or region that is fixed based on the position of the facial part.

Figure 5:
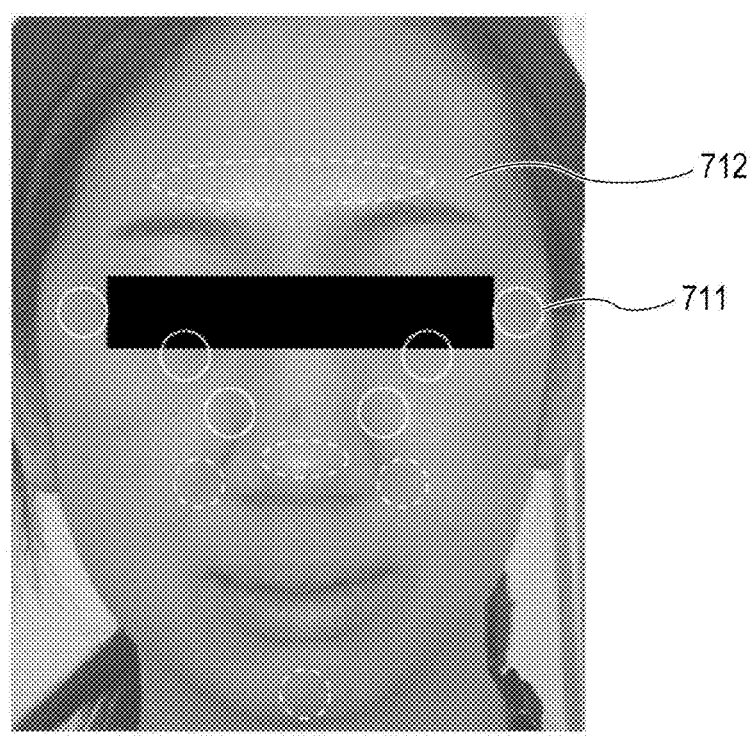
FIG. 5 illustrates an example of a fixed point in the second exemplary embodiment.

FIG. 5 is a view illustrating an example of the fixed point.

As illustrated in FIG. 5, for example, fixed point 711 is a region that is fixed based on the position of the facial part such as the nose and the eyes of face 712 of the person.

For example, fixed point 711 is set to a portion, such as a tip of the nose, a portion between eyebrows, side portions of wings of the nose, and a tip of a jaw, in which a glassy degree is easily strengthened from an irregular characteristic of the face of the person or a portion such as a portion below eyes, side portions of outer corners of eyes, and side portions of a ridge of the nose, in which a shadow degree is easily strengthened. For example, fixed point 711 set to the portion in which the glossy degree is easily strengthened is a region surrounded by a broken line in FIG. 5. For example, fixed point 711 set to the portion in which the shadow degree is easily strengthened is a region surrounded by a solid line in FIG. 5.

In the second exemplary embodiment, it is assumed that N (in the second exemplary embodiment, N is an integer that is greater than or equal to 2 and less than or equal to L) fixed points 711 are set.

Positional information indicating a correspondence relation between the position of the fixed point of the face and positions of first to L-th light sources 210₁ to 210_L is previously stored in information storage 510.

FIG. 6 is a view illustrating an example of a content of the positional information.

As illustrated in FIG. 6, in positional information 720, identification information 722 on light source 210 corresponding to the fixed point indicated by identification information 721 is described while correlated with identification information 721 on the fixed point.

Light source 210 corresponding to the fixed point means one in which the luminance at the fixed point viewed from photographing unit 300 is changed when the luminosity is largely changed. For example, light source 210 is one that is located closer to the fixed point than other light sources 210. Specifically, for example, in the case that the fixed point is located at the jaw, light source 210 is one that is disposed in a lower portion of lighting photographing device 100.

Image acquisition unit 520 in FIG. 4 controls photographing operation of photographing unit 300, and acquires an image (hereinafter, referred to as a "photographed image") photographed by photographing unit 300. For example, the photographed image is acquired based on an instruction from lighting adjuster 540. Image acquisition unit 520 outputs the acquired image to luminance acquisition unit 530 and image output unit 550.

Luminance acquisition unit 530 detects the facial part from the input photographed image by a well-known image analysis technology such as pattern matching based on the facial part information, and acquires the position of each fixed point based on the fixed point information and the detected position of the facial part. Luminance acquisition unit 530 acquires the luminance value at the position of the fixed point of the photographed image as the luminance measured value in each fixed point. Luminance acquisition unit 530 outputs the acquired luminance measured value at each fixed point to lighting adjuster 540.

In the case that the fixed point is a region constructed with a plurality of pixels, for example, luminance acquisition unit 530 acquires an average value of the luminance values of the plurality of pixels as the luminance measured value of the fixed point.

Based on the input luminance measured value, lighting adjuster 540 individually controls first to L-th light sources $210_1$ to $210_L$ to adjust the lighting on the user's face. When such a predetermined condition that the desired glossy state is obtained is satisfied, lighting adjuster 540 issues an instruction to image output unit 550 to output the photographed image.

In the second exemplary embodiment, lighting adjuster 540 performs light control processing including at least one of predetermined light reduction processing and predetermined light increase processing based on the positional information stored in information storage 510 and the luminance measured value of each fixed point. The predetermined light reduction processing means one of reducing the luminosity of light source 210 corresponding to the fixed point when the luminance measured value of the fixed point is higher than a predetermined setting value. The predetermined light increase processing means one of increasing the luminosity of light source 210 corresponding to the fixed point when the luminance measured value of the fixed point is lower than the predetermined setting value.

For example, the luminosity of each light source 210 can be adjusted by modulating a pulse width (duty ratio) of a supplied power supply current. In this case, the duty ratio of the power supply current supplied to light source 210 can be used as a value (hereinafter, referred to as a "luminosity control value") for controlling the luminosity of each light source 210. Lighting adjuster 540 performs the light control processing by adjusting the luminosity control value.

A setting value of the luminance is a target value of the luminance of each fixed point in the photographed image. A value previously fixed according to a purpose of use of the photographed image is used as the setting value. The setting value may be one value or a numerical range including a plurality of values.

The setting value may be identical with respect to all the fixed points or different in each fixed point. For example, desirably the setting value of the fixed point in the portion such as the tip of the nose in which the glossy degree is easily strengthened is higher than that in the portion such as the portions below eyes in which the shadow degree is easily strengthened. The setting value may be a value, such as a value based on the average value of the luminance of the whole face, which changes according to a content of the image.

In response to the instruction from lighting adjuster 540, image output unit 550 outputs the input photographed image to display 400 and displays the photographed image on display 400. The photographed image includes the image that is photographed under the lighting adjusted by the lighting adjuster 540.

Although not illustrated, lighting control device 500 includes the storage medium such as a ROM in which the CPU and the control program are stored and the work memory such as a RAM. In this case, the CPU executes the control program to implement a function of each unit.

Lighting control device 500 having the above configuration individually controls first to L-th light sources $210_1$ to $210_L$ such that the luminance of each fixed point in the user's face comes close to the setting value, and lighting control device 500 adjusts the lighting on the face such that the luminance of the fixed point comes close to the predetermined setting value.

(Operation of Device)

The operation of lighting control device 500 will be described below.

Figure 7:
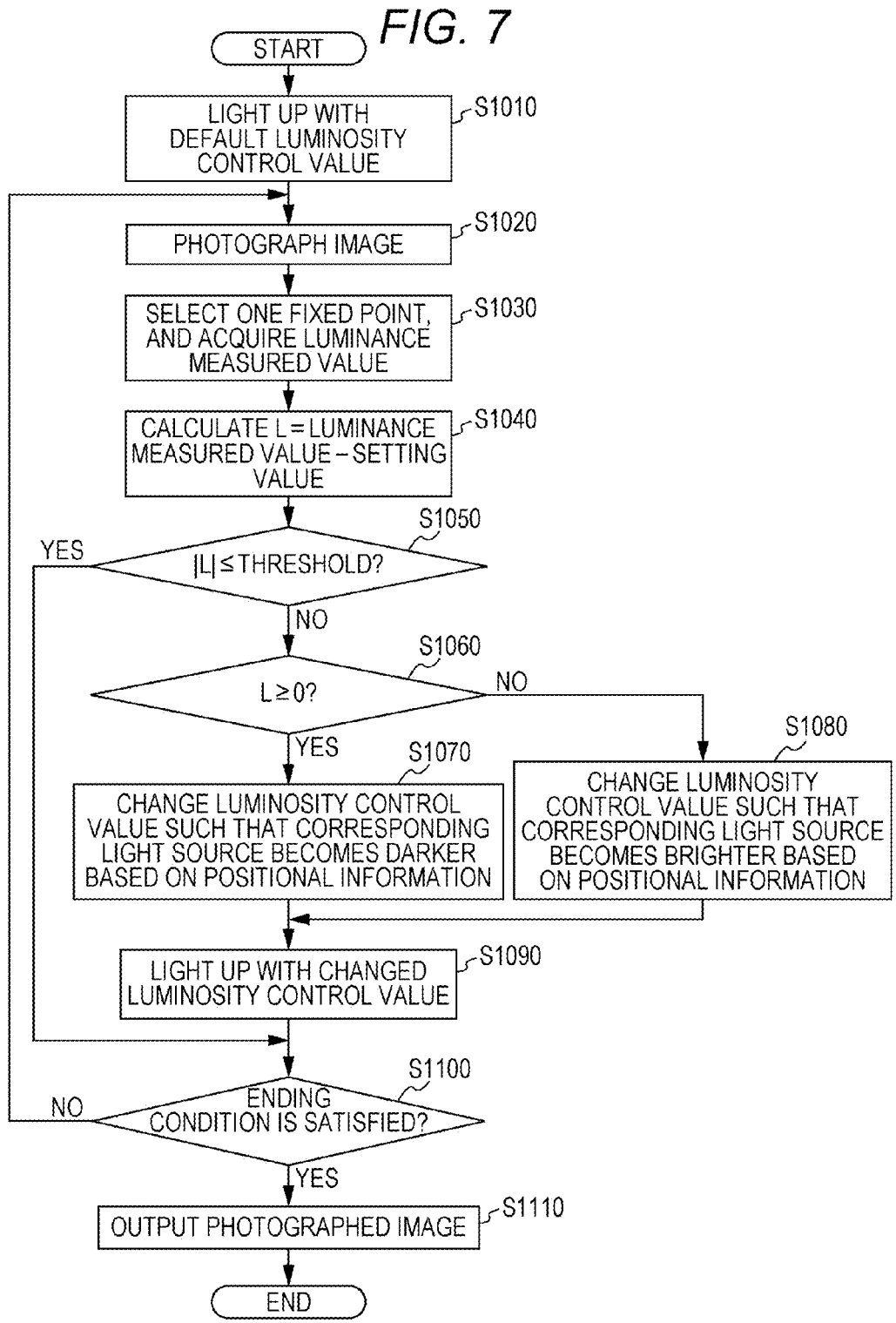
FIG. 7 is a flowchart illustrating an example of operation of the lighting control device according to the second exemplary embodiment.

FIG. 7 is a flowchart illustrating an example of the operation of lighting control device 500.

In Step S1010, lighting adjuster 540 lights lighting unit 200 with a default luminosity control value (basic lighting). For example, the default luminosity control value is one corresponding to 50% of a maximum output of light source 210. In the case that it is clear that the lighting is insufficient only by surrounding light, the default luminosity control value may be zero, namely, one corresponding to turn-off of the light.

In Step S1020, image acquisition unit 520 photographs the facial image of the user using photographing unit 300.

In Step S1030, luminance acquisition unit 530 selects one of the fixed points, and acquires the luminance at the position of the selected fixed point in the photographed image as the luminance measured value.

A sequence to select the first to N-th fixed points may previously or randomly be fixed. In the case that the more even glossy state is obtained, desirably the first to N-th fixed points are selected such that light sources 210 in which lighting spots are located farther way from each other (for example, light sources 210 disposed in a diagonal direction) are preferentially alternately selected.

Luminance acquisition unit 530 may detect all the facial parts necessary to identify the positions of all the fixed points, and select one fixed point after acquiring the positions of all the fixed points. Alternatively, after selecting one fixed point of the acquisition target, luminance acquisition unit 530 may detect only the facial part necessary to acquire the fixed point, and acquire the position of the fixed point.

In Step S1040, lighting adjuster 540 calculates luminance value difference L in which the setting value indicating the setting value information is subtracted from the acquired luminance measured value. Luminance value difference L indicates the adjusting direction and degree of the luminance of the lighting on the fixed point.

In Step S1050, lighting adjuster 540 determines whether an absolute value of the calculated luminance value difference L is less than or equal to a predetermined threshold. The threshold indicates an acceptable range of luminance value difference L.

Similarly to the setting value, a value previously fixed according to the purpose of use of the photographed image is used as the threshold.

For example, in the case that wrinkle detection processing is performed on the photographed image, the setting value and the threshold are used such that a range from a value (lower limit of the target value of the luminance) in which the threshold is subtracted from the setting value to a value (upper limit of the target value of the luminance) in which the threshold is added to the setting value is included in a luminance range where the wrinkle can be detected with desired accuracy. Similarly to the setting value, the threshold may be identical with respect to all the fixed points or different in each fixed point.

When the absolute value of luminance value difference L is less than or equal to the threshold (YES in S1050), lighting adjuster 540 advances the processing to Step S1100. When the absolute value of luminance value difference L is greater than the threshold (NO in S1050), lighting adjuster 540 advances the processing to Step S1060.

In Step S1060, lighting adjuster 540 determines whether luminance value difference L is greater than or equal to zero.

When luminance value difference L is greater than or equal to zero (positive value) (YES in S1060), lighting adjuster 540 advances the processing to Step S1070. When luminance value difference L is less than zero (negative value) (NO in S1060), lighting adjuster 540 advances the processing to Step S1080.

In Step S1070, lighting adjuster 540 changes the luminosity control value of light source 210 based on the positional information (see FIG. 6) such that the luminosity of light source 210 corresponding to the currently-selected fixed point becomes lower (light reduction processing). For example, lighting adjuster 540 decreases the duty ratio that is of the luminosity control value in the pulse width modulation to a half. The processing of changing the luminosity control value of light source 210 can include the processing of turning off light source 210.

On the other hand, in Step S1080, lighting adjuster 540 changes the luminosity control value of light source 210 based on the positional information (see FIG. 6) such that the luminosity of light source 210 corresponding to the currently-selected fixed point becomes higher (light increase processing). For example, lighting adjuster 540 increases the duty ratio, which is of the luminosity control value in the pulse width modulation, by 1.5 times. In the case that corresponding light source 210 is turned off, lighting adjuster 540 decides the luminosity control value corresponding to 25% of the maximum output of light source 210.

In Step S1090, lighting adjuster 540 lights lighting unit 200 with the changed luminosity control value. That is, lighting adjuster 540 provides the changed luminosity control value to light source 210 corresponding to the currently-selected fixed point. The changed luminosity control value is maintained at least until the luminosity control value is further changed or until the processing in Step S1110 is performed.

In Step S1100, lighting adjuster 540 determines whether a predetermined ending condition is satisfied. For example, the predetermined ending condition means a condition that all the luminance measured values of the first to N-th fixed points fall within a predetermined range, a condition that the pieces of processing in Steps S1020 to S1100 are repeated a predetermined number of times or more, or a condition that an instruction to end the processing is issued by the manipulation of the user.

When the predetermined ending condition is not satisfied (NO in S1100), lighting adjuster 540 returns the processing to Step S1020. That is, lighting adjuster 540 issues an instruction to image acquisition unit 520 to perform the new photographing. When the predetermined ending condition is satisfied (YES in S1100), lighting adjuster 540 advances the processing to Step S1110.

In Step S1110, image output unit 550 issues an instruction to image output unit 550 to output the photographed image. The photographed image is one in which the glossy state of the user's face comes closer to the desired state. That is, using the display 400, image output unit 550 displays the photographed image in which the glossy state of the user's face is adjusted.

Through the above operation, lighting control device 500 can adjust the glossy state of the user's face such that the luminance of each fixed point comes close to the setting value, or such that the luminances of all the fixed points fall within a predetermined range.

Effect of Second Exemplary Embodiment

As described above, lighting control device 500 of the second exemplary embodiment acquires the luminance measured value of each fixed point from the photographed image of the user's face. Based on the acquired luminance measured value of each fixed point, lighting control device 500 individually controls the plurality of light source 210, and adjusts the lighting on the face such that the luminance of the fixed point comes close to the predetermined setting value.

Therefore, lighting control device 500 can easily adjust the glossy state of the user's face to the desired state with no use of a special box in which the face is fitted unlike the conventional technology. Unlike the conventional technology, lighting control device 500 of the second exemplary embodiment can provide a glossy distribution in which the luminance varies in each portion.

For example, in the case that the photographed image is analyzed to detect the wrinkle of the skin, there is a high possibility of generating error detection or a detection failure when the gloss of the skin is excessively strengthened or when the shadow of the skin is excessively thickened. Accordingly, the use of lighting control device 500 can perform the high-accuracy wrinkle detection processing.

Additionally, until the predetermined condition is satisfied, lighting control device 500 repeats the acquisition of the luminance measured value and the output adjustment of light source 210 while switching the interested fixed point.

Therefore, lighting control device 500 of the second exemplary embodiment can bring the glossy state of the face as close to the predetermined state as possible within a possible range of lighting unit 200.

The luminance distribution in the non-lighting state can increase depending on the surrounding light such that a left half of the face is darkened while a right half of the face is lightened.

In order to deal with the large luminance difference, desirably lighting unit 200 can provide a large luminance difference to each portion of the face. In this case, for example, the number of light sources 210 may be increased, the irradiation direction of light source 210 may largely be varied, or directivity of each light source 210 is enhanced to vary the irradiation region among the plurality of light sources 210. The position of lighting unit 200 or each light source 210 relative to photographing unit 300 may be movable.

However, depending on the condition, the glossy state of the face can be brought close to the predetermined state even in one light source 210. Accordingly, lighting photographing device 100 includes only one light source 210, and lighting control device 500 may control only one light source 210 to adjust the lighting on the face based on the luminance measured value.

However, in the case that the object has the irregular surface like the face while the state of the surrounding light is unspecified, the use of the plurality of light sources 210 irradiating the object from different directions can more securely bring the glossy state close to the predetermined state.

Third Exemplary Embodiment

A third exemplary embodiment of the present disclosure is an example in which the lighting control device of the second exemplary embodiment is modified such that the output adjustment of the necessary light source is performed at once.

(Configuration of Device)

The configuration of the lighting control device of the third exemplary embodiment will be described.

Figure 8:
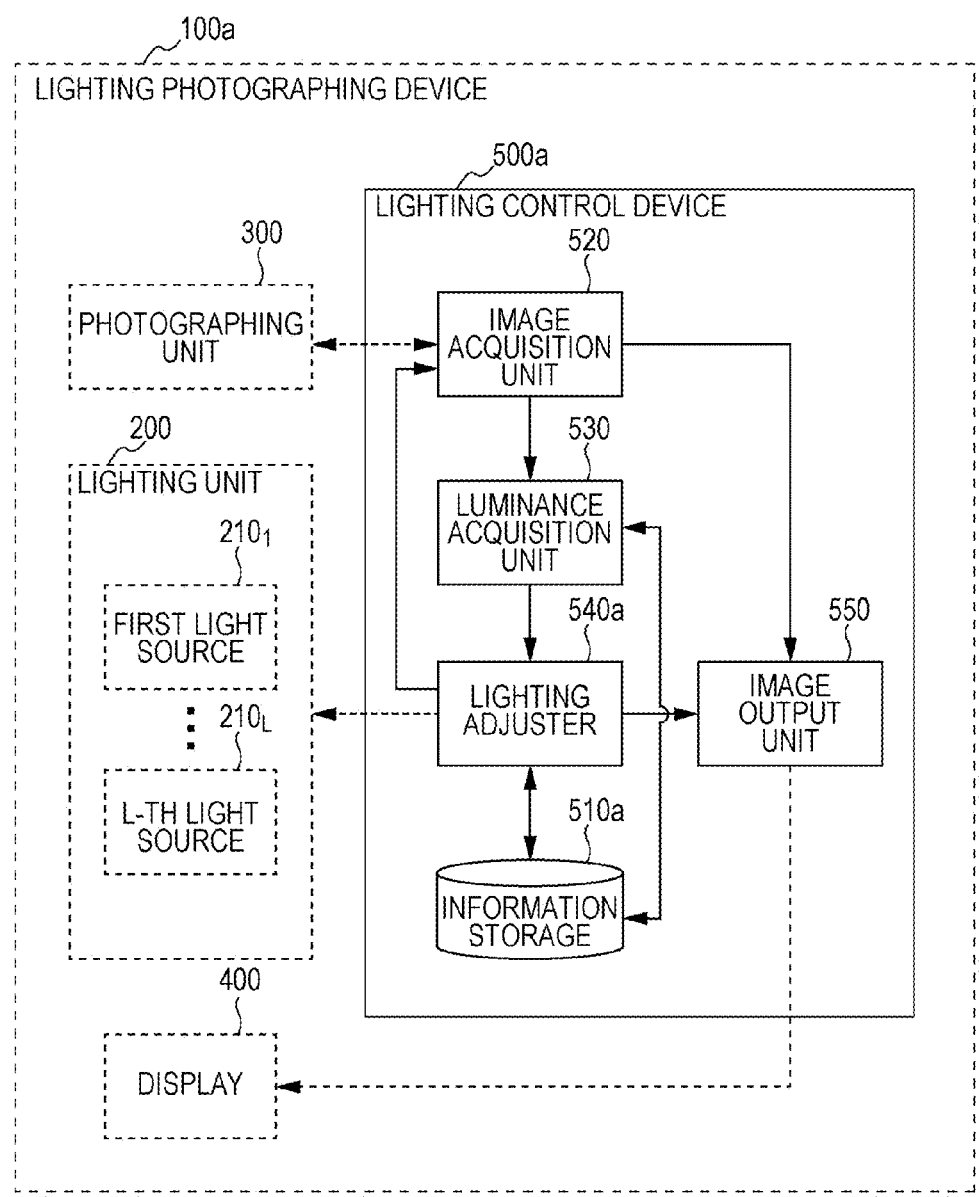
FIG. 8 illustrates an example of a configuration of a lighting control device according to a third exemplary embodiment.

FIG. 8 is a block diagram illustrating an example of the configuration of the lighting control device of the third exemplary embodiment, and corresponds to FIG. 4 of the second exemplary embodiment. The same component as that in FIG. 4 is designated by the same numeral, and the description is omitted. Although not illustrated, the lighting control device of the third exemplary embodiment has the hardware configuration similar to that of the lighting control device of the second exemplary embodiment.

It is necessary to fix the positional relationship between photographing unit 300 and first to L-th light sources $210_1$ to $210_L$ at least after calibration described later.

In FIG. 8, lighting control device 500a that is a part of lighting photographing device 100a includes information storage 510a and lighting adjuster 540a instead of information storage 510 and lighting adjuster 540 in FIG. 4.

Reference information is previously stored in information storage 510a. The reference information is a correspondence relation between the luminosity control values of first to L-th light sources $210_1$ to $210_L$ and the luminance of the fixed point. More specifically, the reference information is generated based on the luminance measured value of a reference point when the reference point is viewed from photographing unit 300 (predetermined viewpoint) while first to L-th light sources $210_1$ to $210_L$ are operated with a predetermined luminosity control value.

At this point, the reference point means a point, in which the direction with respect to photographing unit 300 is matched with that of the fixed point while a distance to light source 210 is already known. In the third exemplary embodiment, the reference point is a point in a white paper that is prepared in calibrating the outputs of first to L-th light sources $210_1$ to $210_L$. The detailed reference information is described later.

In the case that the fixed point is fixed based on the position of the user's facial part, the direction of the fixed point relative to photographing unit 300 (predetermined viewpoint) is unspecified. Accordingly, for example, the reference points are set at many positions in a grid shape, and only the reference point in which the direction is approximate to that of the fixed point may be used as the final reference point in adjusting the lighting on the user's face. Only the reference point in which the direction is resultantly matched with that of the fixed point will be described below.

Based on the reference information, lighting adjuster 540a adjusts the luminosity control value such that the luminance of the fixed point comes close to the predetermined setting value. Based on the reference information and the one-time photographed image, lighting adjuster 540a performs necessary correction of the one or plurality of luminosity control values at once. The luminosity control value adjusting technique performed by lighting adjuster 540a is described in detail later.

In the third exemplary embodiment, immediately after the photographed image is obtained before the luminosity control value is corrected, the photographed image in which the luminosity control value is corrected is obtained. Accordingly, image acquisition unit 520 may issue the instruction to image output unit 550 to output the photographed image, or image output unit 550 may determine the output of the photographed image.

Lighting control device 500a having the above configuration can adjust lighting unit 200 using the reference information indicating the correspondence relation between the luminosity control values of first to L-th light sources $210_1$ to $210_L$ and the luminances of the first to N-th fixed points.

(Reference Information and Technique of Adjusting Luminosity Control Value)

The detailed reference information and the detailed technique of adjusting the luminosity control value will be described below.

As described above, the luminosity of each light source 210 can be adjusted by modulating the pulse width (duty ratio) of the supplied power supply current. On the other hand, the luminosity of light source 210 for the identical luminosity control value degrades due to aging, and a degree of the degradation varies in each light source 210.

For this reason, in order to obtain the ideal lighting, first to L-th light sources $210_1$ to $210_L$ are periodically calibrated, or calibrated in factory shipment of lighting photographing device 100a.

As used herein, the ideal lighting means one in which the luminance of the reference point in the white paper becomes a predetermined ideal value when photographing unit 300 photographs the white paper disposed near the home position of the face in parallel to principal surface 111.

As described above, the reference point means the point in which the direction with respect to photographing unit 300 is matched with that of the fixed point. However, as described above, strictly the facial fixed point is unspecified. Accordingly, it is assumed that the direction matching between the fixed point and the reference point is a concept including a direction difference falls within a predetermined range.

The calibration is performed as follows.

At first, all light sources 210 are operated with the maximum output, and the luminance measured value of each reference point in the photographed image is acquired from the image in which the white paper is photographed with photographing unit 300.

Using the following equation (1), lighting adjuster 540a or a separately-prepared calibration unit (not illustrated) obtains luminosity adjusting matrix V such that the luminance measured values of the first to N-th reference points are matched with ideal values. Luminosity adjusting matrix V is a diagonal matrix (hereinafter, referred to as a "luminosity adjusting matrix") in which adjusting values $v_{11}$, $v_{22}$, ..., $v_{LL}$ provided to the luminosity control values of first to L-th light sources $210_1$ to $210_L$ are used as a diagonal element. Each adjusting value v corresponds to a ratio of the output to the maximum output of corresponding light source 210. For example, the adjusting value v is the duty ratio in the pulse width modulation.

[Mathematical formula 1]

$$R = D \cdot V \cdot P \quad (1)$$

Where R is a matrix (hereinafter, referred to as a "reference point luminance matrix") in which luminance measured values $r_1, r_2, \ldots, r_N$ of the first to N-th reference points are used as elements.

D is a matrix (hereinafter, referred to as a "space matrix") in which $d_{n1}, d_{n2}, \ldots, d_{nL}$ each of which is inversely proportional to a square of a distances between the n-th reference point and each of first to L-th light sources $210_1$ to $210_L$ with respect to the first to N-th reference points.

P is a matrix (hereinafter, referred to as a "light source luminosity matrix") in which luminosities $p_1, p_2, \ldots, p_L$ of first to L-th light sources $210_1$ to $210_L$ are used as elements.

That is, the equation (1) is expressed by the following equation (2).

[Mathematical formula 2]

$$\begin{bmatrix} r_1 \\ r_1 \\ \vdots \\ r_N \end{bmatrix} = \begin{bmatrix} d_{11} & d_{12} & \cdots & d_{1L} \\ d_{21} & d_{12} & & d_{2L} \\ \vdots & & \ddots & \vdots \\ d_{N1} & d_{N2} & \cdots & d_{NL} \end{bmatrix} \begin{bmatrix} v_{11} & & & 0 \\ & v_{12} & & \\ & & \ddots & \\ 0 & & & v_{LL} \end{bmatrix} \begin{bmatrix} p_1 \\ p_1 \\ \vdots \\ p_L \end{bmatrix} \quad (2)$$

Light source luminosity matrix $P^0$ at the maximum output is obtained from the equation (2) with light source luminosity matrix P as a variable.

The luminance of each reference point is measured while light source 210 is driven with the maximum output. The obtained luminance measured value is substituted for reference point luminance matrix R. Space matrix D is an already-known constant because space matrix D is fixed by the positional relationship between lighting unit 200 and the white paper. Because each light source 210 is driven with the maximum output, 1.0 is substituted for diagonal elements $v_{11}, v_{22}, \ldots, v_{LL}$ of luminosity adjusting matrix V. Therefore, light source luminosity matrix $P^0$ indicating the maximum value of the actual luminosity of each light source 210 is obtained from the equation (2).

Specifically, for example, light source luminosity matrix $P^0$ is expressed by the following equation (3).

[Mathematical formula 3]

$$P^0 = V^{-1} \cdot D^{-1} \cdot R \quad (3)$$

Using luminosity adjusting matrix V as a variable, luminosity adjusting matrix $V^0$ is obtained from the equation (2) such that luminance measured values $r_1, r_2, \ldots, r_N$ of the first to N-th reference points are matched with ideal values $r^c_1, r^c_2, \ldots, r^c_N$, respectively. Ideal values $r^c_1, r^c_2, \ldots, r^c_N$ may be identical to or different from one another.

The following equation (4) is solved using reference point luminance matrix $R^c$ in which ideal values $r^c_1, r^c_2, \ldots, r^c_N$ are substituted for reference point luminance matrix R. Where $d_{jk}^{-1}$ is an element (j,k) of inverse matrix $D^{-1}$ of the space matrix. $p^0_j$ is a j element of light source luminosity matrix $P^0$. $v^0_{jj}$ is an element (j,j) of luminosity adjusting matrix $V^0$.

[Mathematical formula 4]

$$V^0 \cdot P^0 = D^{-1} \cdot R^c \quad \therefore v^0_{jj} = \frac{\sum_{k=1}^{N} d_{jk}^{-1} \cdot r_k}{p^0_j} \quad (4)$$

Thus, luminosity adjusting matrix $V^0$ is obtained such that the luminance measured value of the first to N-th reference points are matched with the ideal values, respectively. Obtained luminosity adjusting matrix $V^0$ and light source luminosity matrix $P^0$ constituting the calculation reference of luminosity adjusting matrix V0 are stored in information storage 510a as the reference information.

FIG. 9 is a view illustrating an example of a content of the reference information.

As illustrated in FIG. 9, reference information 730a includes elements $v^0_{11}, v^0_{22}, \ldots, v^0_{LL}$ of luminosity adjusting matrix $V^0$ and elements $p^0_1, p^0_2, \ldots, p^0_L$ of light source luminosity matrix $P^0$.

The irregularity exists in the user's face, and a degree of irregularity depends on the individual. Accordingly, the distance between the fixed point and light source 210 differs from the distance between the fixed point and light source 210, which is used in the calibration. Accordingly, the luminances of the fixed points are not matched with ideal values $r^c_1, r^c_2, \ldots, r^c_N$ even if luminosity adjusting matrix $V^0$ is directly used.

On the other hand, the illuminance of the light emitted from the light source is proportional to the luminosity, and is inversely proportional to a square of a distance between the light source and an observation position. The luminance at a certain position is proportional to the illuminance of the light corresponding to the position. Accordingly, the luminance of the facial fixed point can be brought close to any value by adjusting the luminosity of light source 210. In the case that the light from the outside, the skin state, and the orientation of the skin have a little influence, a distance between each fixed point and each light source 210 can be estimated with a certain degree of accuracy from a difference in luminance between the reference point of the white paper and the fixed point of the face.

When the distance between each fixed point and each light source 210 is estimated, similarly to each reference point during the calibration, the luminance of each fixed point can be brought close to ideal values $r^c_1, r^c_2, \ldots, r^c_N$.

Therefore, lighting control device 500a measures the luminance of each fixed point. In lighting control device 500a, lighting adjuster 540a obtains space matrix $D^u$ for the user's face from obtained luminance measured values $r^u_1, r^u_2, \ldots, r^u_N$ of the first to N-th fixed points and luminosity adjusting matrix $V^0$ and light source luminosity matrix $P^0$ that are of the reference information. For example, lighting adjuster 540a calculates space matrix $D^u$ using the following equation (5). $R^u$ is a fixed point luminance matrix in which luminance measured values $r^u_1, r^u_2, \ldots, r^u_N$ of the first to N-th fixed points are used as elements.

[Mathematical formula 5]

$$D^u = R^u \cdot (V^0 \cdot P^0)^{-1} \quad (5)$$

In lighting control device 500a, lighting adjuster 540a calculates new luminosity adjusting matrix $V^u$ used in the user's face using the following equation (6) similar to the equation (4). $d^{u-1}_{jk}$ is a (j,k) element of inverse matrix $D^{u-1}$ of the space matrix for the user's face. $v^u_{jj}$ is a (j,j) element of luminosity adjusting matrix $V^u$ for the user's face.

[Mathematical formula 6]

$$V^u \cdot P^0 = D^{u-1} \cdot R^u \quad \therefore v^u_{jj} = \frac{\sum_{k=1}^{N} d^{u-1}_{jk} \cdot r_k}{p^0_j} \quad (6)$$

In lighting control device 500a, lighting adjuster 540a adjusts the luminosity control values of first to L-th light sources 210₁ to 210_L based on calculated luminosity adjusting matrix $V^u$. L-th light source 210_l is driven with the duty ratio of component $v^u_{ll}$ corresponding to calculated luminosity adjusting matrix $V^u$. Therefore, the luminances of the first to N-th fixed points can be brought close to ideal values $r^c_1, r^c_2, \ldots, r^c_N$.

Thus, the luminance of each fixed point can be brought close to each ideal value by preparing the reference information in which the correspondence relation between the luminosity control value of each light source 210 and the luminance of each fixed point is indicated by the correspondence relation between the luminosity control value of each light source 210 and the luminance of each reference point.

(Operation of Device)

The operation of lighting control device 500a will be described below.

Figure 10:
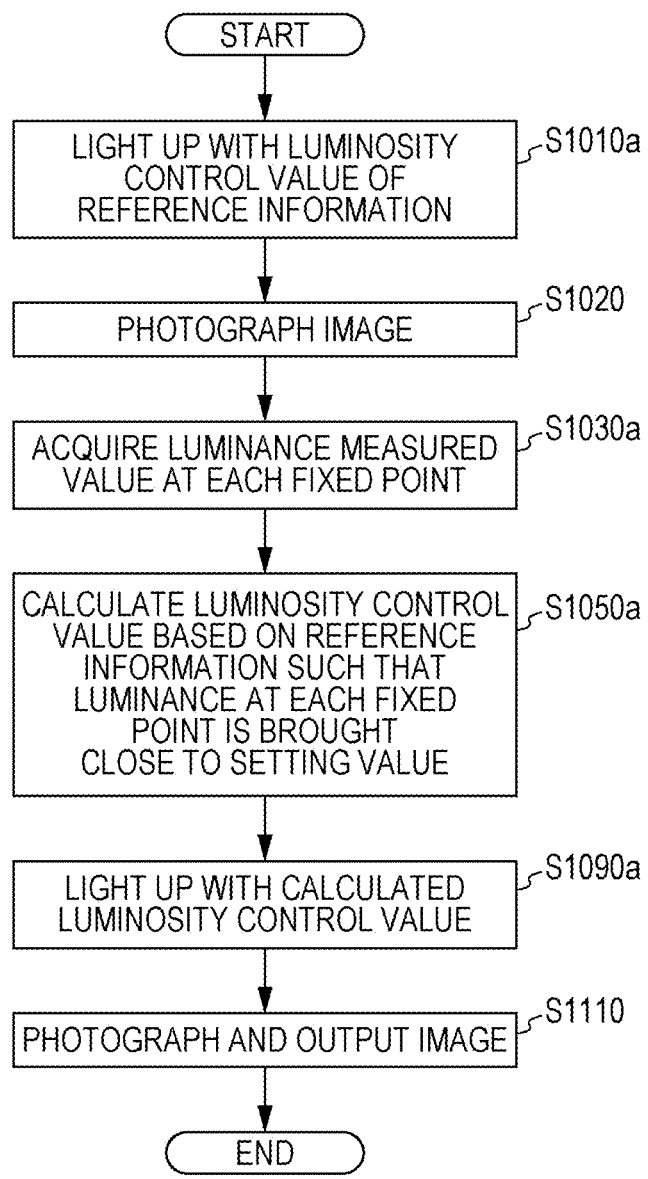
FIG. 10 is a flowchart illustrating an example of the operation of the lighting control device according to the third exemplary embodiment.

FIG. 10 is a flowchart illustrating an example of the operation of the lighting control device 500a, and FIG. 10 corresponds to FIG. 7 of the second exemplary embodiment. The same step number as that in FIG. 7 is designated by the same numeral, and the description is omitted.

In Step S1010a, lighting adjuster 540a lights lighting unit 200 with the luminosity control value of the reference information. That is, lighting adjuster 540a lights first to L-th light sources 210₁ to 210_L based on luminosity adjusting matrix $V^0$.

In Step S1020, image acquisition unit 520 photographs the facial image of the user using photographing unit 300.

In Step S1030a, luminance acquisition unit 530 acquires the luminance measured values at first to N-th fixed points from the photographed image. That is, luminance acquisition unit 530 acquires fixed point luminance matrix $R^u$.

In Step S1050a, lighting adjuster 540a calculates the luminosity control value based on the reference information such that the luminance of each fixed point is brought close to the setting value. Using the equation (6), lighting adjuster 540a calculates luminosity adjusting matrix $V^u$ for the user's face based on fixed point luminance matrix $R^u$, luminosity adjusting matrix $V^0$, and light source luminosity matrix $P^0$.

In Step S1090a, lighting adjuster 540a lights lighting unit 200 with the calculated luminosity control value. Lighting adjuster 540a adjusts the luminosities of first to L-th light sources 210₁ to 210_L based on calculated luminosity adjusting matrix $V^u$. The processing goes to Step S1110 to perform the photographing of the face and the output of the photographed image.

Through the above operation, lighting control device 500a can bring the luminances of all the fixed points close to the predetermined setting value by adjusting lighting unit 200 using the reference information at once.

Effect of Third Exemplary Embodiment

As described above, the reference information indicating the correspondence relation between the luminosity control value of each light source 210 and the luminance of each fixed point is previously stored in lighting control device 500a of the third exemplary embodiment. Based on the reference information, lighting control device 500a adjusts the luminosity control value of each light source 210 such that the luminance of the fixed point comes close to the predetermined setting value.

Therefore, lighting photographing device 100a provided with lighting control device 500a adjusts the glossy state of the user's face such that the luminance of each fixed point comes close to the setting value, and lighting photographing device 100a can perform the photographing in a shorter time compared with the second exemplary embodiment.

In the case that the light from the outside, the skin state, and the orientation of the skin have a large influence, possibly the luminance of each fixed point does not come close to the setting value, or not fall within the predetermined range. Lighting control device 500a may acquire the luminance measured value of each fixed point from the post-adjustment photographed image, and perform the pieces of processing (Steps S1020 to S1100 in FIG. 7) of the second exemplary embodiment according to an acquisition result.

Desirably the calibration is periodically performed. In this case, the lighting photographing device uses luminosity adjusting matrix $V^0$ and light source luminosity matrix $P^0$, which are obtained by the last calibration, as the reference information.

However, it is difficult for the user to create a calibration environment. For example, every time luminosity adjusting matrix $V^u$ is calculated using the equations (5) and (6) in adjusting the lighting, lighting adjuster 540 stores a ratio of luminosity adjusting matrix $V^0$ of the reference information to calculated luminosity adjusting matrix $V^u$. Lighting adjuster 540 may use a value in which a reciprocal of a time-weighted average value of the stored ratio is multiplied by initial luminosity adjusting matrix $V^0$ as new luminosity adjusting matrix $V^0$.

Modifications of Each Exemplary Embodiment

In the first to third exemplary embodiments, the luminance measured value of the object is acquired to adjust the lighting. Alternatively, the illuminance measured value is acquired, and the lighting may be adjusted similarly to the case of the luminance measured value.

The type of the light source, the number of light sources, the disposition of the light source, the type and position of the photographing unit, and the type and position of the display are not limited to the first to third exemplary embodiments.

The lighting photographing device does not necessarily include the display. In this case, for example, the image output unit transmits data of the photographed image to external devices such as a server and a printer, or records the data in removable recording mediums such as a USB (Universal Serial Bus) memory or external readable recording mediums such as a hard disk.

The lighting unit, the photographing unit, the display, and the lighting control device may be constructed so as to be detachable from each other.

For example, a function of the lighting control device can be installed on a tablet terminal provided with the photographing unit and display. In this case, the lighting unit may be a frame type lighting device including a fixed unit in which the tablet terminal is fixedly fitted and a connection unit that is connected to a control signal output terminal of the tablet terminal.

A part of the configuration of the lighting control device may be separated from other parts while disposed in an external device such as a server on a network. In this case, it is necessary that the lighting control device include a communicator that conducts communication with the external device.

The usage of the lighting control device and light control method of the present disclosure is not limited to the diagnosis of the skin. For example, the present disclosure can be applied to various face lighting devices and methods such as a makeup assisting device. The object that is the adjustment target of the glossy state is not limited to the face of the person. For example, the object may be an industrial product or a commodity. That is, the present disclosure can be used in checking on a scratch or a flaw of the industrial product or advertisement photographing of the commodity.

SUMMARY OF THE PRESENT DISCLOSURE

A lighting control device of the present disclosure includes: a luminance acquisition unit that acquires a luminance measured value of a fixed point of an object when the object is viewed from a predetermined viewpoint; and a lighting adjuster that individually controls a plurality of light sources irradiating the object from different directions based on the luminance measured value, and adjusts lighting on the object such that the luminance of the fixed point comes close to a predetermined setting value.

The lighting control device may further include an information storage in which positional information is stored, the positional information indicating a correspondence relation between positions of a plurality of fixed points and positions of the plurality of light sources. At this point, the lighting adjuster performs light control processing including at least one of light reduction processing and light increase processing based on the positional information, the lighting adjuster performing the light reduction processing of reducing luminosity of the light source corresponding to the fixed point when the luminance measured value of the fixed point is higher than the predetermined setting value, the lighting adjuster performing the light increase processing of increasing the luminosity of the light source corresponding to the fixed point when the luminance measured value of the fixed point is lower than the predetermined setting value.

In the lighting control device, the lighting adjuster may sequentially perform the light control processing on each of the plurality of fixed points until a predetermined condition is satisfied.

In the lighting control device, the predetermined condition may include a condition that the luminance measured values of the plurality of fixed points fall within a predetermined range.

The lighting control device may further include an information storage in which reference information is stored, the reference information indicating a correspondence relation between a luminosity control value of the light source and the luminance of the fixed point. At this point, the lighting adjuster adjusts the luminosity control value based on the reference information such that the luminance of fixed point comes close to the predetermined setting value.

In the lighting control device, the reference information may be information that is generated based on the luminance measured value when a reference point is viewed from the predetermined viewpoint while the plurality of light sources are operated with a predetermined luminosity control value, a distance between the reference point and the light source being already known.

The lighting control device may further include an image acquisition unit that acquires an image photographed with an imaging device photographing the object from the predetermined viewpoint. At this point, the luminance acquisition unit acquires the luminance of the fixed point in the image as the luminance measured value.

In the lighting control device, the object may be a face, and the luminance acquisition unit may detect a facial part from the image, and acquires the fixed point based on a position of the detected facial part.

The lighting control device may further include an image output unit that outputs the image photographed with the photographing device under the lighting adjusted by the lighting adjuster.

A light control method of the present disclosure includes: acquiring a luminance measured value of a fixed point of an object when the object is viewed from a predetermined viewpoint; and controlling individually a plurality of light sources irradiating the object from different directions based on the luminance measured value, and adjusting lighting on the object such that the luminance of the fixed point comes close to a predetermined setting value.

In the first to third exemplary embodiments, the present disclosure is constructed with hardware by way of example. Alternatively, the present disclosure may be constructed with software in conjunction with hardware.

Typically each functional block of the first to third exemplary embodiments is made as an LSI that is of an integrated circuit. The functional blocks may individually be integrated into one chip, or a part or all the functional blocks may integrated into one chip. At this point, the chip may be called the LSI, or the chip may be called an IC, a system LSI, a super LSI, or an ultra LSI depending on a degree of integration.

The present disclosure is useful for the lighting control device and light control method for being able to easily adjust the glossy state of the object.

What is claimed is:

1. A lighting control device comprising:
   luminance acquiring circuitry that acquires a luminance measured value of a fixed point of an object which is viewed from a predetermined viewpoint;
   lighting adjusting circuitry that individually controls a plurality of light sources irradiating the object from different directions based on the luminance measured value, and adjusts lighting on the object for a luminance value of the fixed point to approach a predetermined setting value; and
   an information storage that stores positional information, the positional information indicating a correspondence relation between positions of a plurality of fixed points and positions of the plurality of light sources, wherein the lighting adjusting circuitry performs a light control processing including at least one of light reduction and light increase based on the positional information, the lighting adjusting circuitry performs the light reduction of reducing luminosity of a light source corresponding to the fixed point when the luminance measured value of the fixed point is higher than the predetermined setting value, and the lighting adjusting circuitry performs the light increase of increasing the luminosity of the light source corresponding to the fixed point when the luminance measured value of the fixed point is lower than the predetermined setting value.

2. The lighting control device according to claim 1, wherein the lighting adjusting circuitry sequentially performs the light control processing on each of the plurality of fixed points until a predetermined condition is satisfied.

3. The lighting control device according to claim 2, wherein the predetermined condition includes a condition that luminance measured values of the plurality of fixed points are within a predetermined range.

4. The lighting control device according to claim 1, wherein the information storage further stores reference information is indicating a correspondence relation between luminosity control values of the plurality of light sources and luminance values of the plurality of fixed points, and
wherein the lighting adjusting circuitry adjusts a luminosity control value based on the reference information for the luminance value of the fixed point to approach the predetermined setting value.

5. The lighting control device according to claim 4, wherein the reference information is information that is generated based on the luminance measured value when a reference point is viewed from the predetermined viewpoint while the plurality of light sources are operated with a predetermined luminosity control value, the reference point whose distance from the light source being previously obtained.

6. The lighting control device according to claim 1, further comprising an image acquiring circuitry that acquires an image photographed with an imaging device photographing the object from the predetermined viewpoint,
wherein the luminance acquiring circuitry acquires a luminance value of the fixed point in the image as the luminance measured value.

7. The lighting control device according to claim 6, wherein the object is a face, and
the luminance acquiring circuitry detects a facial part in the image, and acquires the fixed point based on a position of the detected facial part.

8. The lighting control device according to claim 6, further comprising an image output unit that outputs the image photographed with the photographing device subjected to a lighting adjustment by the lighting adjusting circuitry.

9. A light control method comprising:
acquiring a luminance measured value of a fixed point of an object when the object is viewed from a predetermined viewpoint;
controlling individually a plurality of light sources irradiating the object from different directions based on the luminance measured value;
adjusting lighting on the object for a luminance value of the fixed point to approach a predetermined setting value; and
storing positional information indicating a correspondence relation between positions of a plurality of fixed points and positions of the plurality of light sources,
wherein the adjusting of the lighting includes performing a light control processing including at least one of light reduction and light increase based on the positional information,
wherein the light reduction is performed by reducing luminosity of a light source corresponding to the fixed point when the luminance measured value of the fixed point is higher than the predetermined setting value, and
wherein the light increase is performed by increasing the luminosity of the light source corresponding to the fixed point when the luminance measured value of the fixed point is lower than the predetermined setting value.

* * * * *